(12) United States Patent
Crist et al.

(10) Patent No.: US 9,747,588 B2
(45) Date of Patent: Aug. 29, 2017

(54) AUTOMATED TELLER MACHINE ("ATM") CURRENCY STAMPER

(71) Applicant: Bank of America Corporation, Charlotte, NC (US)

(72) Inventors: Kristy M. Crist, Charlotte, NC (US); Terrelle Carswell, Jr., Charlotte, NC (US); Eric McConnell, Cornelius, NC (US); Rahul Puri, Charlotte, NC (US); Devin D. Rhodes, Lexington, KY (US); James D. Goodwin, Kansas City, MO (US)

(73) Assignee: Bank of America Corporation, Charlotte, NC (US)

( * ) Notice: Subject to any disclaimer, the term of this patent is extended or adjusted under 35 U.S.C. 154(b) by 596 days.

(21) Appl. No.: 13/890,457

(22) Filed: May 9, 2013

(65) Prior Publication Data
US 2014/0337211 A1 Nov. 13, 2014

(51) Int. Cl.
| | |
|---|---|
| *G06Q 20/10* | (2012.01) |
| *G07F 19/00* | (2006.01) |
| *G06Q 20/26* | (2012.01) |
| *G07D 7/12* | (2016.01) |
| *G07D 11/00* | (2006.01) |

(Continued)

(52) U.S. Cl.
CPC ....... *G06Q 20/1085* (2013.01); *G06K 19/025* (2013.01); *G06Q 20/26* (2013.01); *G07D 7/12* (2013.01); *G07D 11/009* (2013.01); *G07D 11/0021* (2013.01); *G07D 11/0036* (2013.01);

(Continued)

(58) Field of Classification Search
CPC .................................................. G06Q 20/1085
See application file for complete search history.

(56) References Cited

U.S. PATENT DOCUMENTS 5,369,709 A * 11/1994 Foreman et al. ............... 380/51
5,945,602 A 8/1999 Ross
(Continued)

FOREIGN PATENT DOCUMENTS

EP 1843303 10/2007

OTHER PUBLICATIONS

"Diebold Opteva Divert/ Retract ATM Cassette—Tamper-Indicating," DieboldDirect.com, Feb. 17, 2013.
(Continued)

*Primary Examiner* — Abhishek Vyas
*Assistant Examiner* — Liz P Nguyen
(74) *Attorney, Agent, or Firm* — Weiss & Arons LLP; Michael A. Springs, Esq.

(57) ABSTRACT

Apparatus and methods for an automated teller machine ("ATM") currency stamper are provided. The currency stamper may be configured to mark currency retracted by the ATM. The mark may include one or more attributes of the currency. The mark may include transaction information associated with a dispensing and/or retraction of the currency. Marked currency may be stored in the ATM. Marked currency may be scanned. A scanning of marked currency may read the attributes of the currency and the transaction information included in the mark. The scanning of the marked currency may erase the mark. A value of the marked currency may be calculated. The value may be determined based on the currency attributes and transaction information included in the mark applied to the currency.

17 Claims, 7 Drawing Sheets

(51) Int. Cl.
*G06K 19/02* (2006.01)
*H04N 1/32* (2006.01)

(52) U.S. Cl.
CPC ....... *G07D 11/0066* (2013.01); *G07F 19/203* (2013.01); *H04N 1/32149* (2013.01)

(56) References Cited

U.S. PATENT DOCUMENTS

| | | | | |
|---|---|---|---|---|
| 6,073,837 | A * | 6/2000 | Milne | 235/379 |
| 7,347,359 | B2 | 3/2008 | Boyes et al. | |
| 7,638,746 | B2 | 12/2009 | Jespersen | |
| 7,856,401 | B2 | 12/2010 | Ross et al. | |
| 2005/0010525 | A1* | 1/2005 | Ross | G06K 7/0008 705/43 |
| 2010/0290152 | A1* | 11/2010 | Uchida | G11B 5/855 360/75 |

OTHER PUBLICATIONS

"Bank ATMs stop sucking in cash after RBI direction," EconomicTimes.com, Sep. 23, 2012.

\* cited by examiner

AUTOMATED TELLER MACHINE ("ATM") CURRENCY STAMPER

FIELD OF TECHNOLOGY

Aspects of the invention relate to reducing costs associated with automated teller machine ("ATM") mis-dispense claims.

BACKGROUND

ATMs provide banking customers an ability to access bank account information, deposit funds and withdraw cash. ATMs may often obviate the need for a banking customer to consult a human clerk. Additionally, ATMs may be located in a variety of diverse locations remote from banking centers. For example, ATMs may be placed on street corners, in convenience stores, supermarkets or sports arenas.

In a typical ATM transaction, the customer may submit a request for a withdrawal of an amount of cash. The ATM may determine whether the customer has a bank account balance corresponding to, at least, a value of the requested funds. If the customer has sufficient bank account balance, the ATM may dispense the requested amount of cash.

The ATM may present the requested amount of cash to the customer. If the customer does not collect all of the dispensed cash, the ATM may be configured to retract uncollected cash. The ATM may be configured to wait for an expiration of a "time out" period before retracting cash.

An ATM customer may not retrieve all, or a portion of, dispensed cash because of an ATM malfunction. For example, the customer may submit a request for $80.00 in twenty-dollar notes and the ATM may erroneously dispense the requested $40.00 in ten-dollar notes. As a further example, the ATM may not provide sufficient time for the customer to become aware that the cash has been dispensed. The ATM may retract cash before the customer has time to collect dispensed cash.

In response to a retraction of cash by the ATM, a customer may submit a mis-dispense claim. The customer may submit the mis-dispense claim to an operator of the ATM. The customer may submit the mis-dispense claim to an entity responsible for managing a bank account of the customer.

The customer may request a credit for uncollected cash retracted by the ATM. The customer may request that because cash was retracted by the ATM, the account of the customer should not be debited. The customer may allege that none or a portion of a requested amount of cash was collected by the customer.

A wide variety of ATM locations and lack of close supervision at an ATM increases a risk that a customer may submit an unwarranted mis-dispense claim. For example, the customer may intentionally collect only a portion of the dispensed cash. The customer may then submit a mis-dispense claim alleging not to have collected any of the dispensed cash. Unwarranted mis-dispense claim have become so prevalent that some ATM operators have disabled a cash retraction feature of ATMs.

It would be desirable to provide a solution that examines cash retracted by an ATM following an unsuccessful customer withdrawal. Examination of retracted cash may provide information useful in a processing of mis-dispense claims and fraud research. For example, the examination may provide details such as denomination, number of bills retracted and a transaction identifier associated with the retraction.

It would be desirable to provide a solution that examines customer interaction with an ATM. The customer interaction may include collection of dispensed cash. The customer interaction may include a deposit of tangible items into the ATM. The customer interaction may include tampering with one or more components of the ATM. Examination of customer interaction with the ATM may provide information useful in a processing of mis-dispense claims and fraud research.

Additionally, a requirement to replenish the cash supply of the ATM is a cost of operating an ATM or a network of ATMs. Typically, ATMs may be refilled between bi-weekly to per day. Some ATMs in busy locations must be refilled twice a day. ATM operators may be reluctant to stock ATMs with additional cash because until the cash is dispensed from the ATM the cash is idling, increasing an opportunity cost of the cash. Restricting the amount of cash that may be withdrawn by a customer may inconvenience and irritate the customer. Armored personnel and services are typically employed to deliver cash to an ATM, further increasing the cost of replenishing the cash supply of an ATM.

An examination of cash dispensed or retracted by an ATM may indicate that a cash inventory of the ATM is not being efficiently utilized. Obtaining accurate information relating to cash dispensing or retracting may allow an ATM operator to better manage a cash inventory of an ATM or network of ATMs.

For example, an ability to examine cash prior to dispensing the cash may verify that genuine notes of the correct denomination are being dispensed from the ATM. The examination may reduce a cost of dispensing counterfeit notes, non-currency items or incorrect denominations that may have been erroneously loaded into the ATM. Detection of an erroneous loading of cash into the ATM may identify a human error or a process breakdown related to cash inventory.

Therefore, it would be desirable to obtain detail associated with cash dispensed or retracted from an ATM. It would be desirable to obtain transaction detail associated with cash dispensed or retracted from an ATM. The transaction detail may supply information used in managing cash supplied to an ATM.

Therefore, it would be desirable to provide apparatus and methods for marking of retracted currency.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Apparatus and methods for marking a tangible item are provided. The tangible item may include currency, tickets boarding passes or any tangible item dispensed by a self-service kiosk ("SSK"). Apparatus and methods may be applied to validate a number of items that are dispensed or retracted by a SSK.

Apparatus and methods may be deployed at any suitable self-service kiosk ("SSK") that dispenses tangible items. Apparatus and methods may be applied to cash dispensing equipment including ATMs, currency recyclers and self-checkout machines located at retail merchants. Apparatus and methods may be applicable dispensing of non-cash items—i.e., airport kiosks, self-serve movie theater kiosks—and any suitable self-service kiosk that dispenses or retracts items.

Methods may be performed by an apparatus. The apparatus may include a non-transitory computer readable medium. The non-transitory computer readable medium may include computer readable program code embodied therein. The apparatus may include a processor. The processor may be configured to execute the computer readable program code.

Methods may include retracting currency dispensed at a SSK. The currency may include a plurality of bills. The SSK may be an automated teller machine ("ATM"). The methods may include receiving a request for an amount of currency. In response to the request, the methods may include extracting the amount of currency from a cash cassette. The cash cassette may store cash available to be dispensed by the ATM. The methods may include dispensing the amount of currency. The currency may include a plurality of notes or bills.

The methods may include retracting at least a portion of the dispensed amount of currency. The portion of the amount of currency may include a plurality of notes or bills. The retracted currency may be currency that was not collected by the customer. The methods may include applying a mark to the retracted currency. The methods may include applying the mark to each note or bill in a plurality of notes or bills.

The mark may be an ultraviolet stamp. The mark may be applied using a medium that does not deface the currency. The mark may be applied using a medium that is not visible to a human eye. The mark may be applied to at least the portion of an amount of retracted currency.

The methods may include storing retracted currency in a purge-bin. The currency may be stored in the purge-bin after the mark is applied to the retracted currency. The methods may include removing the retracted currency from the purge-bin. The methods may include scanning the mark applied to the retracted currency. The methods may include determining a value of retracted currency based on the scanning.

For example, each bill that is retracted by an ATM may be stamped with an ultraviolet mark. The retracted bills may be stored in a purge-bin of the ATM. The purge-bin may be removable from the ATM. The currency stored in the purge-bin may be extracted. The marked currency may be transferred to a reader that extracts information included in the ultraviolet mark applied to each bill.

The mark may include any suitable information. For example, the mark may include a transaction identifier. The transaction identifier may be associated with an action performed by a SSK. The transaction identifier may be associated with an action performed by a customer of the SSK. The transaction identifier may correspond to a retraction of currency. The transaction identifier may correspond to any suitable action performed by a SSK.

A mark applied to currency may include information associated with a SSK transaction. The information may include a transaction identifier associated with a dispensing of the currency. The transaction identifier may correspond to an SSK session identifier. The SSK session identifier may link one or more transactions that occurred during a SSK session. A dispensing of cash may be a transaction that occurs during the SSK session.

The information may include a denomination of a bill. For example, a SSK may dispense cash from a cash cassette. The cash cassette may be loaded with a specific denomination of cash. For example, the cash cassette may be expected to include only twenty-dollar bills. The mark applied to a retracted bill may include an expected denomination of dispensed currency. After a retracted bill is retrieved from a purge-bin, the retracted currency may be examined.

The examination may include determining a denomination of the retracted currency. The determined denomination may be compared to a denomination included in the mark. Based on the comparison, an ATM operator may identify a mis-loaded cash cassette. The mis-loaded cash cassette may include a cash cassette loaded with a non-cash item or an unexpected denomination. For example, the denomination included in the mark may not match the denomination determined by examination of the currency.

After applying a mark to currency, the currency may be scanned. The scanning may obtain information included in the mark. Based on the information included in the mark, a transaction identifier may be associated with a scanned bill. The transaction identifier may associate the scanned bill with a customer or SSK transaction. The SSK transaction may include a dispensing of cash. Each bill in a purge-bin that is marked with an identical transaction identifier may be associated with one dispensing of cash. A value of cash dispensed may be compared to a value of cash retracted. Based on a difference between the value dispensed and the value retracted, a value of cash collected by an ATM customer may be determined.

Methods may include applying a mark to less than all of a plurality of retracted bills. For example, the mark may be applied to a first retracted bill and a last retracted bill. The mark applied to the first retracted bill may indicate that the first bill is associated with a plurality of bills. The mark applied to the last retracted bill may indicate that the last retracted bill is the last bill associated with the plurality of bills. The mark may be applied to the first and last retracted bills if a SSK dispenses a single denomination. The mark may be applied to the first and last retracted bills if a purge-bin maintains retracted currency in an order.

The methods may include identifying a customer account associated with a withdrawal request. The methods may include debiting the identified customer account a difference between the amount dispensed by a SSK and the value of the currency retracted by the SSK. A difference between the value dispensed and the amount retracted may correspond to currency presumably collected by the customer from the SSK.

The mark may include a denomination of each bill of currency. The mark may include a transaction identifier associated with a request for the amount of currency. The transaction identifier may associate a customer or a customer account with an action performed by a SSK. Including the transaction identifier in a mark may allow marked currency to be associated with a customer.

The methods may include applying the mark after currency is extracting from a cash cassette and prior to dispensing the currency. For example, after extracting currency from the cash cassette, the currency may be marked with an expected denomination of the currency stored in the cash cassette. If the currency is retracted, the retracted currency may be examined to determine if the retracted currency is of the expected denomination.

Methods may include erasing a previously applied mark. Easing the mark may prevent marked bills from being recirculated. Erasing the mark may prevent currency marked from being erroneously associated with a transaction identifier or a SSK customer.

In some embodiments, the watermark may expire. For example, after a period of time a quality of the watermark may degrade. The quality may degrade such that the watermark is not readable by a scanner. The quality may degrade such that the watermark is not visible. The watermark may be designed to expire after a threshold period of time. The threshold period of time may be determined based on an expected amount of time needed to retrieve retracted cash from a SSK.

Apparatus may include a cash cassette. The cash cassette may be configured to store cash. Apparatus may include a cash dispenser. The cash dispenser may be configured to disburse cash. The cash dispenser may disburse cash stored in the cash cassette. The disbursed cash may be collected by a customer. The cash dispenser may be configured to retract cash. The cash dispenser may retract cash that is not collected by the customer.

The apparatus may include a stamp applicator. The applicator may be configured to apply a mark to cash. The mark may be an ultraviolet identifier. The stamp applicator may apply the ultraviolet identifier to retracted cash. The stamp applicator may be a component of a SSK. The ultraviolet stamp application may be configured to apply the ultraviolet identifier after cash is retracted by the dispenser.

The ultraviolet stamp applicator may apply an ultraviolet identifier that is invisible to a human eye. Apparatus may include an ultraviolet stamp reader. The ultraviolet stamp reader may be configured to scan the ultraviolet identifier. Scanning the ultraviolet identifier may extract information from the ultraviolet identifier. The apparatus may be configured to read the ultraviolet identifier after the cash is retracted by the dispenser.

The apparatus may include a purge-bin. The purge-bin may be configured to store cash retracted by the dispenser. The ultraviolet stamp reader may be configured to read the ultraviolet identifier after the cash is stored in the purge bin. The apparatus may be configured to read the ultraviolet identifier after the cash is removed from the purge-bin.

The ultraviolet identifier may include a denomination. The ultraviolet identifier may include a transaction identifier. The transaction identifier may be associated with a request for an amount of cash. The request may be submitted by a customer. The request may be submitted by the customer to a SSK. The request may include an account number associated with the customer. The request may include one or more credentials of the customer.

An ultraviolet identifier may include a time and date. The time and date may correspond to an action performed by a SSK. For example, the time and date may correspond to a retraction of currency by an ATM. The time and date may correspond to a customer request for a withdrawal of currency.

Based on the time and date, a series of SSK actions may be associated with a retraction of currency. For example, the ultraviolet identifier may correspond to a time and date of a retraction. A typical retraction of currency by an SSK may occur within two minutes of a request for a withdrawal. Based on the time and date of the retraction, actions performed by the ATM two minutes prior to the retraction may be associated with the retraction.

Illustrative actions that may be performed by a SSK are shown below in Table 1.

TABLE 1

| Illustrative actions performed by an SSK |
|---|
| Illustrative Actions Performed by an SSK |
| Authenticate customer |
| Access customer account information |
| Dispense cash |
| Receive deposit from a customer |
| Validate deposit |
| Retract cash |
| Print receipt |
| Validate dispensed cash |
| Validate retracted cash |
| Transfer retracted cash to purge-bin |
| Weigh cash |

SSK actions associated with the retraction may be associated with a customer or customer account. For example, a request for a withdrawal may include credentials identifying the customer or the customer account. A database may include a relationship an SSK session and a customer. The SSK session may be associated with one or more transactions and/or actions performed by a SSK.

Methods may include determining a number or value of tangible items retracted by a SSK. The SSK may be an automated teller machine ("ATM"). The tangible items may be bills of currency.

Methods may include receiving a request to dispense a plurality of bills. The plurality of bills may correspond to an amount. Methods may include applying a watermark to each bill in the plurality of bills. The watermark may be an ultraviolet watermark or any suitable watermark. Methods may include associating a transaction identifier with the watermark.

Methods may include retracting at least a portion of the plurality of bills. Methods may include storing the retracted bills in a purge-bin. Methods may include removing the retracted bills from the purge-bin. Methods may include scanning the watermark on each retracted bill. Methods may include scanning the watermark on one or more bills stored in the purge-bin.

Methods may include determining a value corresponding to the retracted bills. The value may correspond to one or more bills retrieved from the purge-bin. Methods may include associating the value with a transaction identifier. The transaction identifier may correspond to an action performed by an SSK. For example, a transaction identifier may correspond to a retraction of cash or a dispensing of cash. Illustrative SSK actions are shown above in Table 1. The SSK may perform one or more actions on behalf of a customer.

The transaction identifier may be associated with information that identifies a customer or customer account. For example, a retracting of bills may be associated with a dispensing of the bills. The dispensing of the bills may be associated with a withdrawal request submitted by a customer.

An association between SSK actions may be based on one or more characteristics of each of the actions. The characteristics may include a temporal link between the actions, a geographic link between the actions or any suitable link between actions.

Methods may include identifying a customer account associated with a transaction identifier. The transaction identifier may be part of a watermark applied to retracted currency. Methods may include debiting the identified customer account a difference between the amount of cash dispensed and the value of cash retracted. The difference may correspond to currency collected by the customer.

Methods may include erasing watermark applied to a bill. The watermark may be an ultraviolet watermark. The erasing may be performed after a scanning of the watermark. Erasing the watermark may prevent a marked bill from erroneously being associated with a customer account.

Methods may include receiving a mis-dispense claim. The mis-dispense claim may include a request for a refund amount. For example, a customer may allege that in response to a request for a withdrawal of $100.00, an SSK dispensed $20.00 or the SSK malfunctioned and did not dispense any currency.

In response to receiving the mis-dispense claim, methods may include identifying a transaction identifier associated with the mis-dispense claim. For example, a mis-dispense claim may include information relating to an alleged SSK malfunction. The information may include an approximate date and/or time of the alleged SSK malfunction. The mis-dispense claim may include a location of the SSK. The mis-dispense claim may include a customer name or an account number.

In response to receiving the mis-dispense claim, information included in a mis-dispense claim may be associated with one or more transaction identifiers. The transaction identifiers may be associated with the mis-dispense claim based on relationship between the transaction identifier and information included in the mis-dispense claim. A database may store relationships among transaction identifiers, customer names, customer account numbers, SSK location and transaction time/dates.

The database may include a relationship that links a set of transactions to information included in an applied watermark. For example, the watermark may include a transaction identifier. The transaction identifier may correspond to retraction of cash by an SSK. The transaction identifier may be associated with a set of transactions conducted during an SSK session. Each member of the set of transactions may have occurred within a threshold time period proximate to the retraction of cash by the SSK. For example, the set of transactions may include submission of a withdrawal request, a dispensing of cash and a retraction of cash.

An association between the set of transactions identifier and the watermark may indicate that the marked currency is associated with one or more of the transactions in the set. The one or more transactions may be used to determine an amount of currency collected by a customer. For example, one member of the set of transactions may include a dispensing of an amount of currency.

Analysis of each transaction in the set may identify a transaction pattern associated with the retraction. The pattern may form a signature associated with a SSK malfunction. The pattern may form a signature associated with unscrupulous customer conduct.

Each SSK retraction may be associated with a unique transaction identifier. Each transaction identifier may be associated with a set of transactions. Analysis of multiple sets of transactions may identify a behavioral pattern. The pattern may identify a set of transactions likely to be associated with a retraction. The pattern may identify a set of transactions likely to be associated with unscrupulous customer behavior.

The pattern may include multiple sets of transactions that occur within a geographic region. Based on the pattern, the geographic region may be identified as a region associated with a high frequency of retractions. In response to identification of the pattern, an SSK operator may disable a retraction capability of one or more SSKs within the region. The one or more SSKs may inform a customer's of the disabling.

Methods may include associating a mis-dispense claim with a value of retracted currency. The value may be determined by scanning a watermark applied to the retracted currency. The value may be determined by tracking a number of bills that each includes a single transaction identifier in the watermark. The value may be determined by tracking each bill that includes a member of a set of transaction identifiers in the watermark. The value may be associated with a mis-dispense claim. The value may be associated with the mis-dispense claim based on a relationship between information included in the mis-dispense claim and information included in the watermark.

The mis-dispense claim may include a request for a refund amount. The refund amount may be an amount of currency that the customer alleges was not dispensed from the SSK. The customer may allege that the un-dispensed amount was debited from the customer's account.

Methods may include comparing a refund amount requested by the customer in the mis-dispense claim to a value of the retracted currency.

Methods may include responding to the mis-dispense claim based on a difference between the refund amount and a value associated with marked currency. For example, a watermark applied to retracted currency may include a transaction identifier that corresponds to a withdrawal request received at an ATM. The watermark may include a denomination of each bill in the retracted currency.

After the retraction, the watermarked currency may be stored in a purge-bin of the ATM. The purge-bin may be removed from the ATM and the watermarked currency may be scanned. The scanning may read the transaction identifier printed on the retracted currency. The scanning may read the denomination printed on each retracted bill. The scanning may include erasing the watermark from each retracted bill.

Based on the scanning, a value of the retracted currency may be determined. The value may be associated with the transaction identifier included in the watermark. The transaction identifier may be linked to the customer that submitted the withdrawal request. If the transaction identifier and the value of the retracted currency value are associated with a customer that submitted the mis-dispense claim, the customer may be limited to a refund amount not greater than the value of the retracted currency.

The watermark may include a time and date stamp. The time and date stamp may be temporally linked to a time and date of an alleged SSK malfunction specified in a mis-dispense claim. The time and date stamp may link a retraction with one or more SSK actions. For example, a retraction may typically be associated with SSK actions that occur two minutes prior and one minute after the retraction. The time and date stamp may correspond to a time during an ATM session initiated by a customer.

For example, methods may identify one or more transactions that occur within a temporal range of a time and date stamp included in a watermark. The one or more transactions may include accessing an account via an ATM. Methods may identify a customer associated with the accessed account. Account information included in the mis-dispense claim may be associated with one or more transactions that occur within a temporal range of a time and date stamp included in a watermark.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
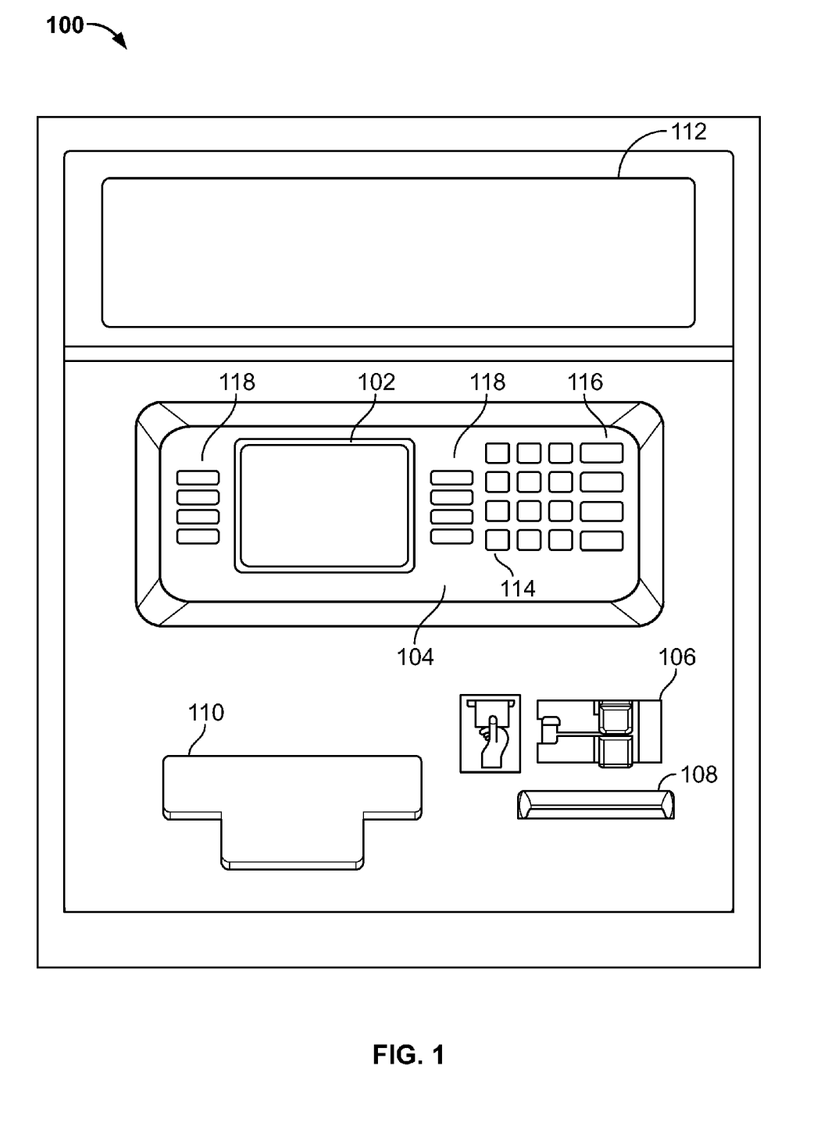
FIG. 1 shows illustrative apparatus in accordance with principles of the invention.

FIG. 1 shows illustrative self-service device 100. Self-service device 100 may be an ATM. Self-service device 100 includes monitor 102, keypad 104, card reader port 106, acceptor 108, item dispenser 110 and security screen 112.

Monitor 102 may exchange visual and or audio information with a customer. Keypad 104 may include alphanumeric keys 114 for the customer to enter numerical and textual data. Keypad 104 may include control keys 116. In some embodiments, control keys 116 may be used to communicate control information, such as instructions, to self-service device 100. Keypad 104 may include soft keys 118. Soft keys 118 may have functions that are dictated by programming and are presented to the customer using information that may be displayed on monitor 102.

Card reader port 106 may be a front end of any suitable card reader. The card reader may read magnetically encoded information on transaction instruments such as bank cards. In some embodiments, self-service device 100 may include a contactless chip reader, a wireless transceiver or any other suitable interface for exchanging transaction information with a transaction instrument. The transaction instrument may be a chip, an RFID tag, a smart card, a tablet, a smartphone or any suitable device.

In some embodiments, self-service device 100 may include a biometric sensor (not shown). The biometric sensor may identify a customer based on a feature, such as an anatomical feature, of the customer. For example, the biometric sensor may be configured to identify the customer based on all or part of a face, a fingerprint, an iris, a retina a hand or any other suitable anatomical feature. The biometric sensor may identify the customer based on a behavioral feature such as a signature, a voice, a gait or any other suitable behavioral feature.

Acceptor 108 may accept any suitable tangible item. For example, acceptor 108 may accept envelopes, deposit forms, bills, checks or any other suitable tangible item. In some embodiments, acceptor 108 may feed into a scanner that digitizes the documents for image-based transaction processing.

Item dispenser 110 may dispense items. For example, item dispenser 110 may dispense bills.

Security screen 112 may visually screen a surveillance device (not shown). The surveillance device may provide video information about individuals that are present near the self-service device and the conditions near the self-service device.

Figure 2:
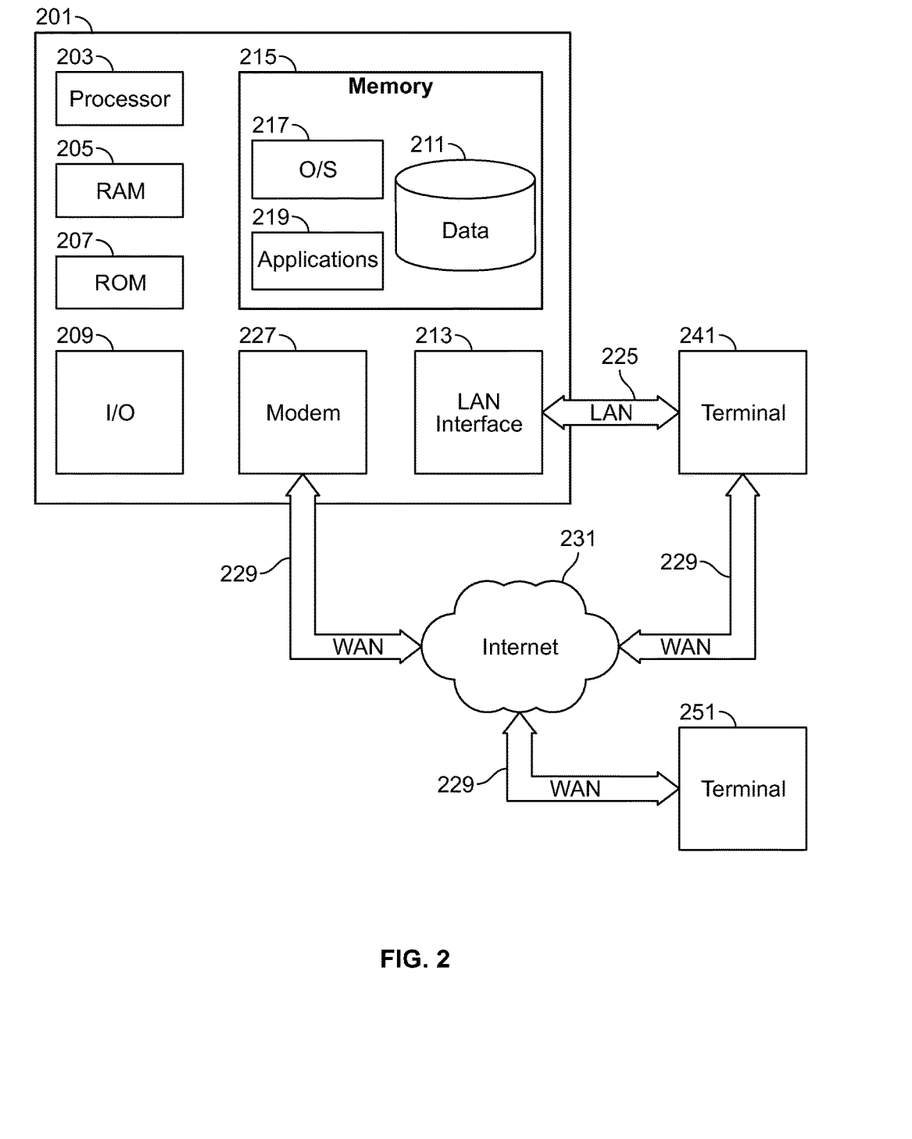
FIG. 2 shows illustrative apparatus in accordance with principles of the invention.

FIG. 2 is a block diagram that illustrates a generic computing device 201 (alternatively referred to herein as a "server") that may be used according to an illustrative embodiment of the invention. The computer server 201 may have a processor 203 for controlling overall operation of the server and its associated components, including RAM 205, ROM 207, input/output module 209, and memory 215.

Input/output ("I/O") module 209 may include a microphone, keypad, touch screen, and/or stylus through which a user of device 201 may provide input, and may also include one or more of a speaker for providing audio output and a video display device for providing textual, audiovisual and/or graphical output. Software may be stored within memory 215 and/or storage to provide instructions to processor 203 for enabling server 201 to perform various functions. For example, memory 215 may store software used by server 201, such as an operating system 217, application programs 219, and an associated database 211. Alternatively, some or all of server 201 computer executable instructions may be embodied in hardware or firmware (not shown).

Server 201 may operate in a networked environment supporting connections to one or more remote computers, such as terminals 241 and 251. Terminals 241 and 251 may be personal computers or servers that include many or all of the elements described above relative to server 201. The network connections depicted in FIG. 2 include a local area network (LAN) 225 and a wide area network (WAN) 229, but may also include other networks. When used in a LAN networking environment, computer 201 is connected to LAN 225 through a network interface or adapter 213. When used in a WAN networking environment, server 201 may include a modem 227 or other means for establishing communications over WAN 229, such as Internet 231.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 219, which may be used by server 201, may include computer executable instructions for invoking user functionality related to communication, such as email, short message service (SMS), and voice input and speech recognition applications.

Computing device 201 and/or terminals 241 or 251 may also be mobile terminals including various other components, such as a battery, speaker, and antennas (not shown).

Terminal 251 and/or terminal 241 may be portable devices such as a laptop, tablet, smartphone or any other suitable device for storing, transmitting and/or transporting relevant information.

Any information described above in connection with database 211, and any other suitable information, may be stored in memory 215.

One or more of applications 219 may include one or more algorithms that may be used to perform analysis of associated transactions, identify transaction patterns, determine values, apply watermarks, scan marked currency, determine a denomination of bills, or any suitable task associated with described apparatus and methods.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, mobile phones, tablets and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 3:
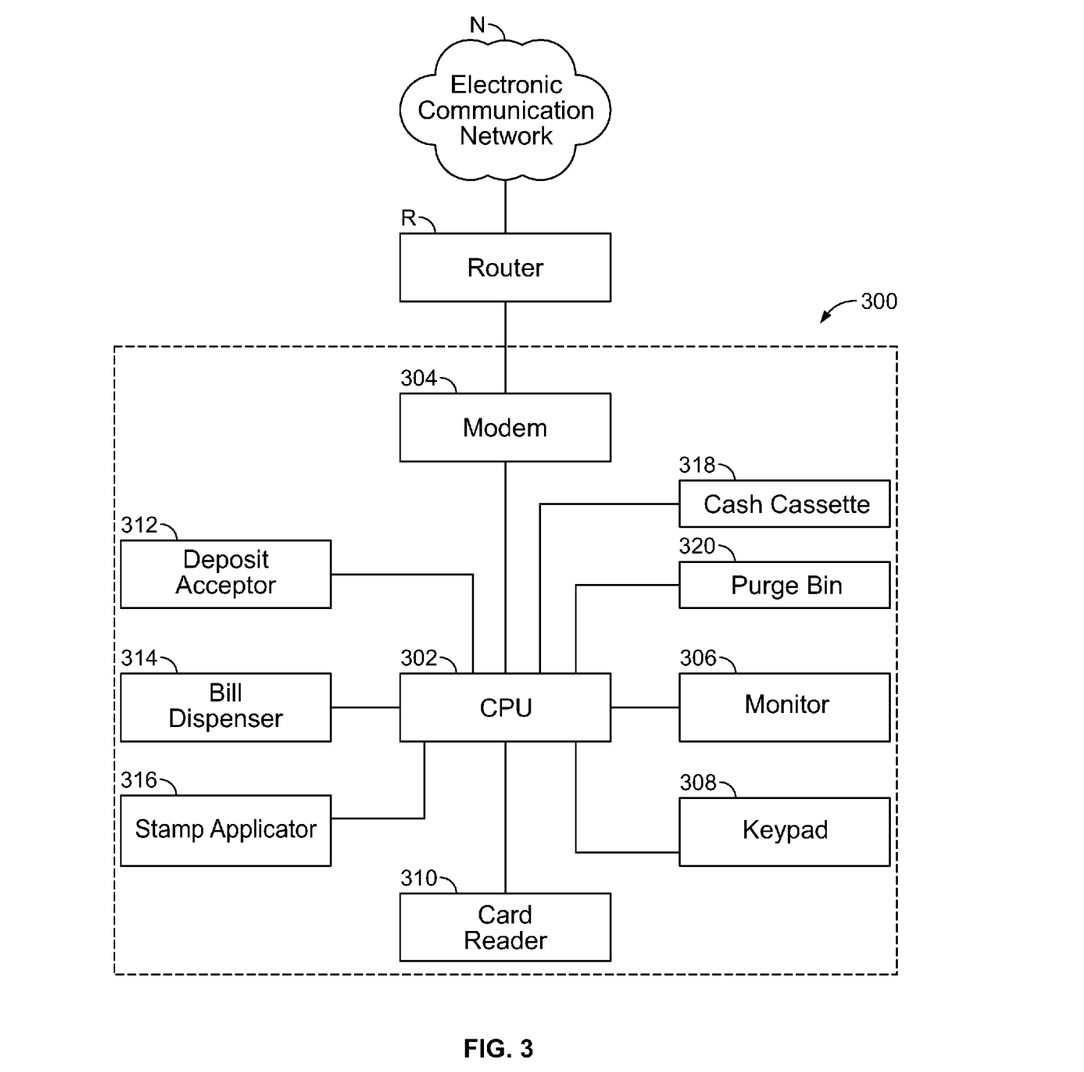
FIG. 3 shows an illustrative apparatus in accordance with principles of the invention.

FIG. 3 shows illustrative components 300 of a self-service kiosk ("SSK"). The SSK may include one or more features of device 100 (shown in FIG. 1). Components 300 may include a control system for controlling a SSK.

Components 300 include CPU 302. CPU 302 may include one or more features of server 201 (shown in FIG. 2). CPU 302 may exchange transaction information with electronic communication network N via modem 304, which is in communication with router R.

CPU 302 may receive transaction information from a customer via monitor 306, keypad 308, card reader 310, deposit acceptor 312 or bill dispenser 314.

CPU 302 may direct the SSK to dispense bills through bill dispenser 314. CPU 302 may transmit information to bill dispenser 314 directing bill dispenser 314 to retract any currency remaining in bill dispenser 314 after expiration of a time out period.

Dispenser 314 may present the cash to a customer of the SSK. Dispenser 314 may retract cash that is not collected by the customer. The retracted cash may be transferred to stamp applicator 316. CPU 302 may instruct stamp applicator 316 to apply a mark to retracted cash. The mark may be applied to each bill that is retracted. The mark may include a transaction identifier. The mark may include a time and date stamp. The mark may include a denomination of each bill in the retracted cash.

CPU 302 may coordinate a transfer of retracted cash. Retracted cash may be transferred from stamp applicator 316 to purge-bin 320. Cash stored in purge-bin 320 may be removed from the SSK. Purge-bin 320 may be removable from the SSK. Cash stored in purge-bin 303 may be removed from purge-bin 303 may transferred to a stamp reader (not shown). The stamp reader may be configured to read information included in a mark applied to currency.

Components 300 include acceptor 312. Acceptor 312 may accept one or more tangible items deposited by a user of the SSK. For example, the user may deposit cash or checks into acceptor 312. CPU 302 may receive a request to deposit a tangible item. CPU 302 may transmit information to deposit acceptor 312. CPU 302 may instruct deposit acceptor 312 to accept one or more tangible items inserted into deposit acceptor 312. A deposited tangible item may be stored in purge-bin 320 or a depository (not shown).

CPU 302 may instruct stamp applicator 316 to mark items inserted into deposit acceptor 312. A tangible item inserted into acceptor 312 may be transferred to applicator 316. Applicator 316 may apply a mark to the deposited tangible item. The mark may identify the tangible item as a deposited item. The mark may include a transaction identifier associated with the deposit. The mark may include an account number associated with the deposit. After being marked, the deposited tangible item may be stored in purge-bin 320 or a depository (not shown).

The deposited items may be marked with a transaction identifier, a time/date stamp a deposit location or any suitable information. Marking the tangible item may provide information that may be used to identify a depositor of a counterfeit of fraudulent tangible item. The information included in an applied mark may be transmitted to network N.

Applicator 316 may apply a mark that includes information received from network N. For example, applicator 316 may receive a transaction identifier via network N. The transaction identifier may be associated, in a database, with information relating to an ATM session, additional transaction identifier, historical transactions, customer identification information, account number or any suitable information.

Components 300 include cash cassette 318. Cash cassette 318 may store tangible items available to be dispensed by the SSK. For example, cash cassette may store cash in one or more denominations. CPU 302 may direct a transfer of cash from cash cassette 318 to bill dispenser 314.

Figure 4:
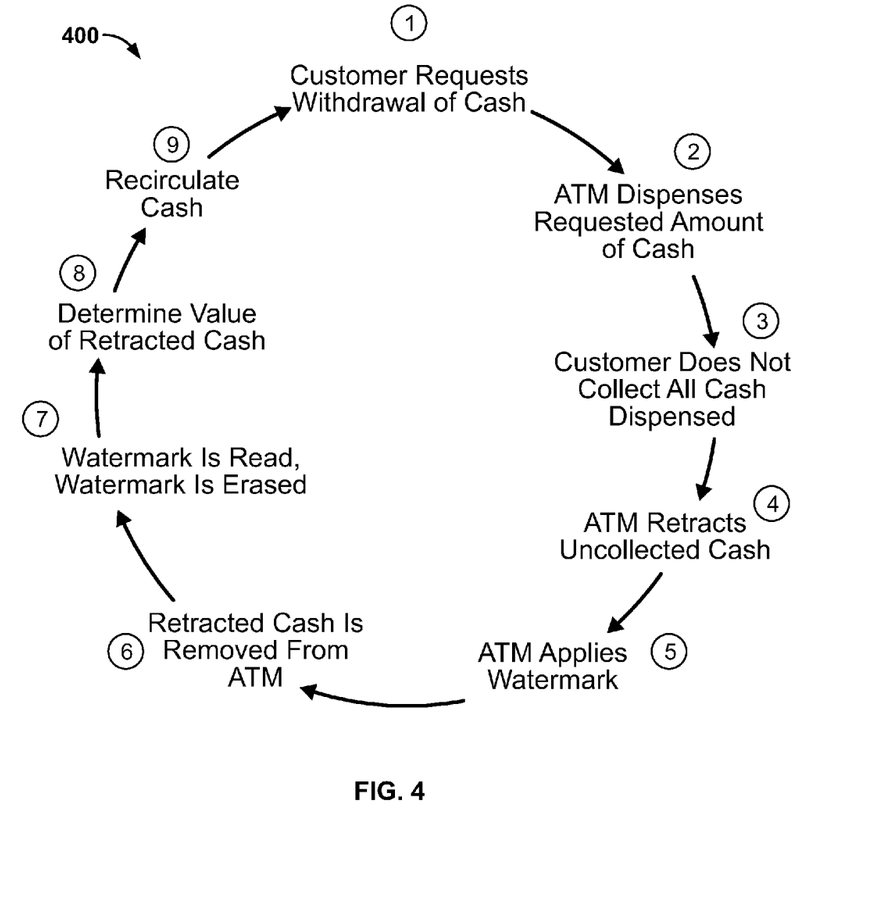
FIG. 4 shows an illustrative process in accordance with principles of the invention.

FIG. 4 shows illustrative process flow 400. For the sake of illustration, the steps of the process illustrated in FIG. 4 will be described as being performed by a "system." The "system" may include one or more of the features of the apparatus that are shown in FIGS. 1-3 and/or any other suitable device or approach. The "system" may be provided by an entity. The entity may be an individual, an organization or any other suitable entity. Arrow between steps in process flow 400 are shown in broken-line to indicate that the steps At step 1, a customer requests a withdrawal of cash. The customer may request the withdrawal by presenting one or more credentials at an ATM. The credentials may include a bank card and a personal identification number.

At step 2, the ATM dispenses an amount of cash requested by the customer. The cash may be presented to the customer via a dispenser of the ATM. The dispenser may include one or more features of dispenser 110 (shown in FIG. 1) or dispenser 314 (shown in FIG. 3).

At step 3, the customer leaves some or all of the dispensed cash in the dispenser. The customer may intentionally leave a portion of the dispensed cash in the dispenser. The customer may unintentionally leave cash in the dispenser. At step 4, the system retracts any uncollected cash.

At step 5, the system applies a mark to the retracted cash. The mark may include an ultraviolet watermark or other suitable mark. The mark may include one or more features of the uncollected cash. The mark may include an ATM session identifier or other suitable transaction identifier. The mark may be applied to each bill included in the retracted cash. The retracted and marked cash may be stored in a purge-bin of the ATM. The purge-bin may include one or more features of purge-bin 320 (shown in FIG. 3).

At step 6, the system removes the retracted and marked cash from the ATM. The cash may be removed from the ATM by removing the purge-bin from the ATM. The retracted cash may be removed from the ATM by armored personnel and services typically employed to transfer cash.

At step 7, the retracted and marked cash stored is scanned. The scanning reads the ultraviolet watermark, or other suitable mark, applied to the retracted cash. The scanning may include erasing the applied mark. Erasing the applied mark may avoid recirculating marked cash that may be mistakenly associated with information included in the mark.

At step 8, the system determines a value of the retracted cash. The value may be determined based on information included in the mark applied to the retracted cash. The value may be determined by examining the retracted cash. The examining may include determining a denomination of each bill marked with a transaction identifier. The examining may include counting each bill marked with a transaction identifier. The retracted cash may be examined by a cash validator.

At step 9, the system recirculates the cash. Recirculating the cash may include loading the cash into a cash cassette, such as cash cassette 318 (shown in FIG. 3). The cash cassette may be inserted into an ATM. In response to a request for a withdrawal of cash, cash may be retrieved from the cash cassette.

Figure 5:
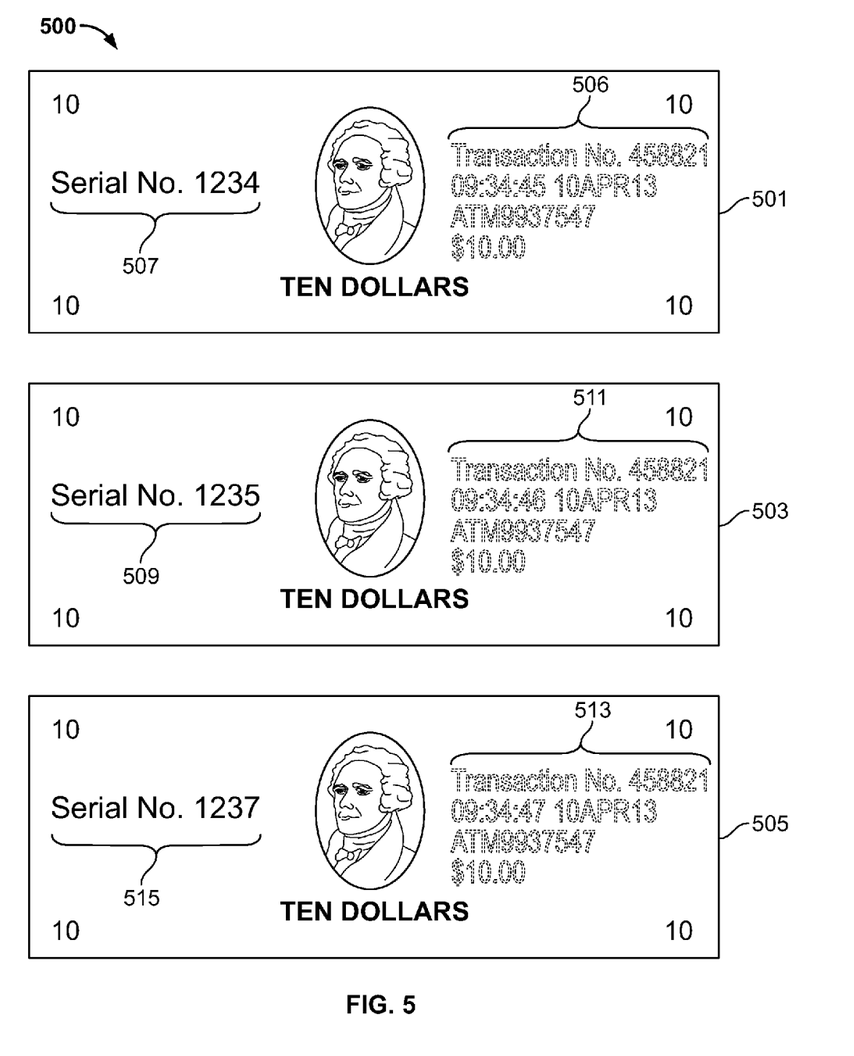
FIG. 5 shows an illustrative information in accordance with principles of the invention.

FIG. 5 shows illustrative marked bills 500. Marked bills 500 include bill 501. Bill 501 includes serial number 507. Serial number 507 may uniquely identify bill 501.

Bill 501 is marked with ultraviolet watermark 505. Watermark 505 is shown in broken-line to indicate that watermark 505 may be invisible to a human eye. Watermark 505 includes a transaction number. The transaction number may be a transaction identifier. Watermark 505 includes a date and time stamp. Watermark 505 includes a device identifier. The device identifier may correspond to specific SSK. The device identifier may correspond to a specific location.

Watermark 505 includes a denomination of bill 501. The denomination may be determined based on a denomination associated with a cash cassette. Watermark 505 may include any suitable information, such as serial number 507.

Marked bills 500 include bills 502 and 504. Bills 501, 502 and 504 are each associated with a one transaction number. The transaction number may correspond to an SSK session. For example, each of bills 501, 502 and 504 may have been retracted during a single SSK session. Each of bills 501, 502 and 504 may have been dispensed in response to a withdrawal request of an SSK customer. Each of bills 501, 502 and 504 may be distinguished based on the unique serial number printed on each bill.

Figure 6:
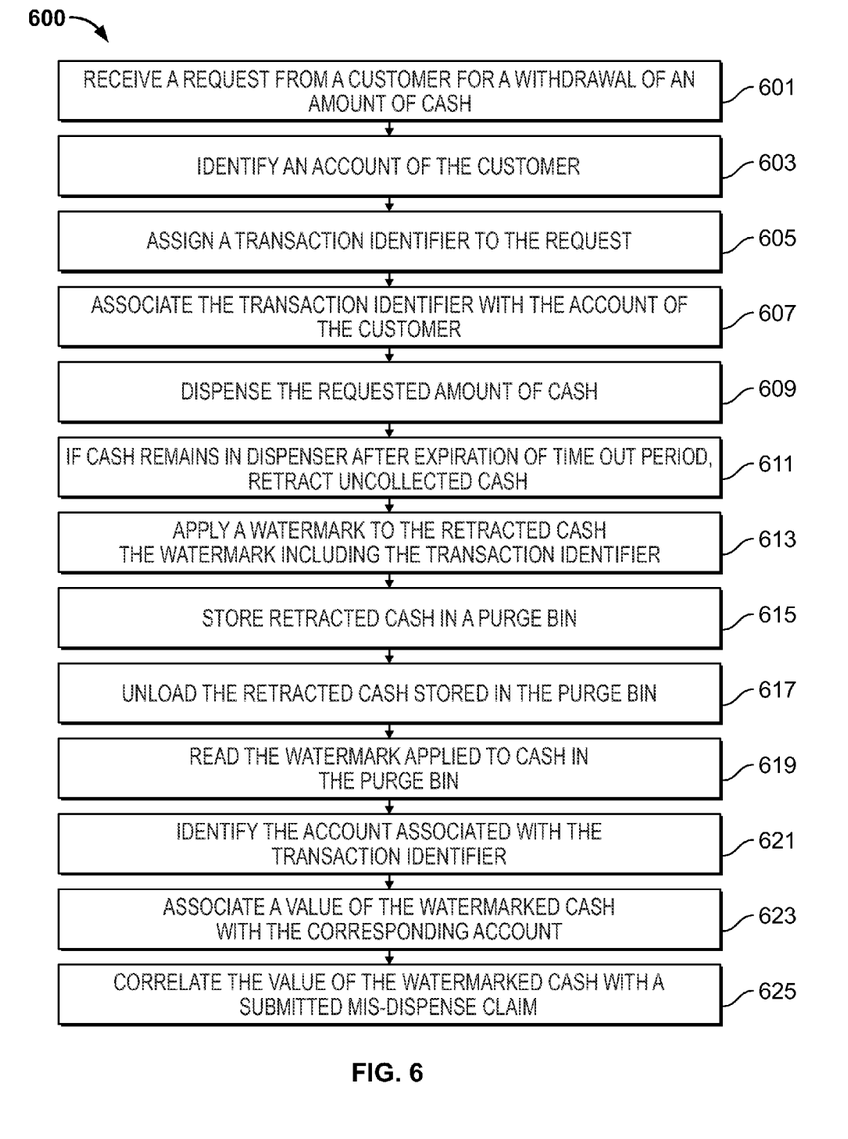
FIG. 6 shows an illustrative process in accordance with principles of the invention.

FIG. 6 shows illustrative process 600. For the sake of illustration, the steps of the process illustrated in FIG. 6 will be described as being performed by a "system." The "system" may include one or more of the features of the apparatus or processes that are shown in FIGS. 1-5 and/or any other suitable device or approach. The "system" may be provided by an entity. The entity may be an individual, an organization or any other suitable entity.

At step 601, the system receives a request from a customer for a withdrawal of an amount of cash. At step 603, the system identifies an account of the customer. At step 605, the system assigns a transaction identifier to the request. At step 607, the system associates the transaction identifier with the account of the customer. The association between the customer account and the transaction identifier may be stored in a database such as database 211 (shown in FIG. 2).

At step 609, the system dispenses the requested amount of cash to the customer. The dispensing may utilize a dispenser such as dispenser 110 (shown in FIG. 1) or dispenser 314 (shown in FIG. 3). If cash remains in the dispenser after expiration of time-out period, at step 611, the system retracts the uncollected cash.

At step 613, the system applies a watermark to the retracted cash. The watermark may be an ultraviolet watermark. The watermark may include printing a RFID tag on a bill. The watermark may be applied to each bill retracted by the system. The watermark includes the transaction identifier associated with the account of the customer.

The watermark may be applied to a portion of the bills retracted by the system. For example, the system may apply the watermark to a first retracted bill and a last retracted bill. The watermark applied to the first and last bills may indicate that any bills between the first and last bills are associated with one transaction identifier.

At step 615, the system stores retracted cash in a purge-bin. At step 617, the system unloads the retracted cash stored in the purge-bin. At step 619, the system reads the watermark applied to cash retrieved from the purge bin. Based on information included in the watermark applied to the retracted cash, at step 621, the system identifies the account associated with the transaction identifier. The account may be identified based on the relationship established at step 607 that links the transaction identifier and the customer's account.

At step 623, the system associates a value of the watermarked cash that includes the transaction identifier with the corresponding account. The value of the retracted cash may be determined based on a denomination included in the watermark. At step 625, the system relates the value of the watermarked cash with a submitted mis-dispense claim. The relation may be established based on information included in the mis-dispense claim. For example, the mis-dispense claim may identify a customer, customer account or transaction identifier.

Figure 7:
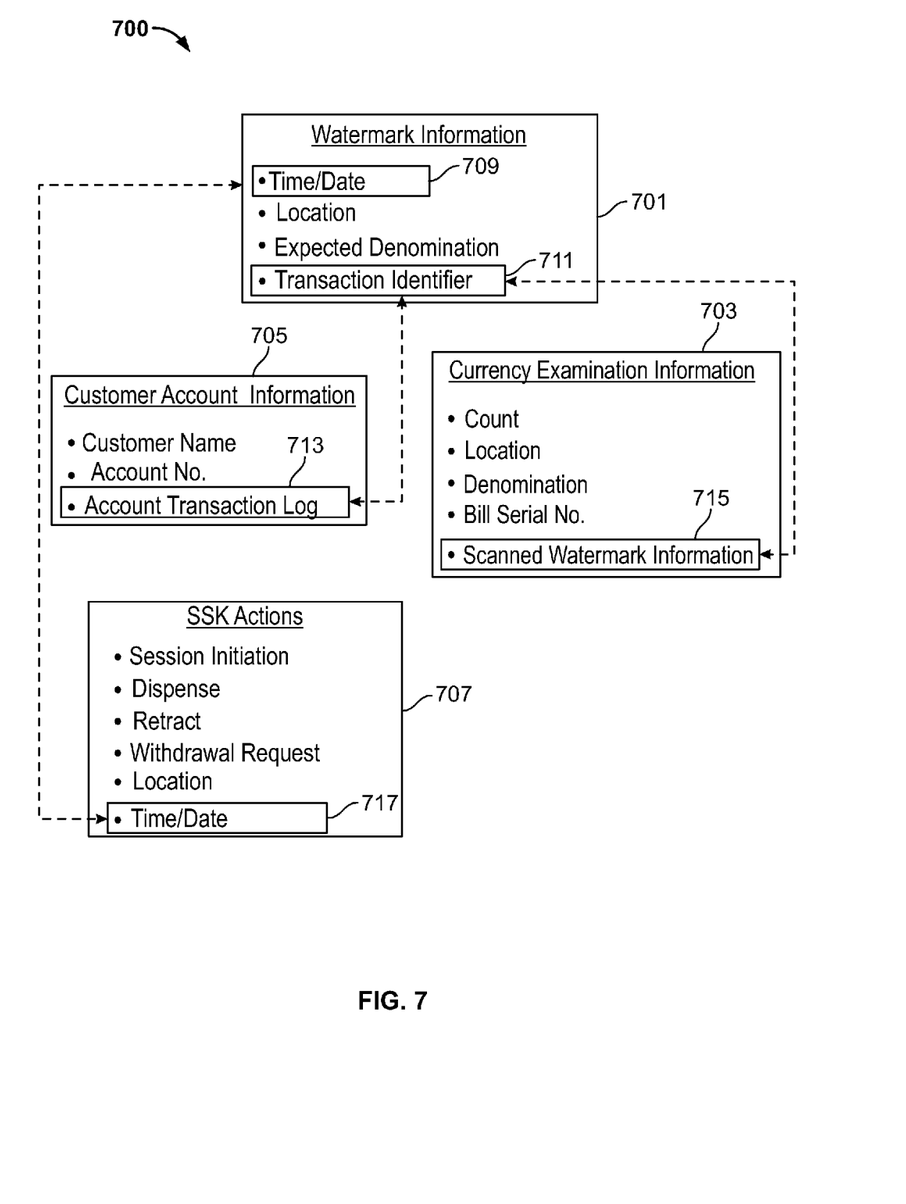
FIG. 7 shows illustrative information in accordance with principles of the invention.

FIG. 7 shows illustrative information 700. Information 700 includes watermark information 701. Information 701 includes one or more attributes that may be included in a watermark applied to currency.

Watermark information 701 includes a time/Date. The time/date may correspond to an action performed by an SSK. The time/date may correspond to request submitted by a customer of the SSK. Watermark information 701 includes a location. The location may correspond to a location of the SSK. Watermark information 701 includes an expected denomination. The expected denomination may correspond to a denomination of currency stored in a cash cassette. Watermark information includes a transaction identifier. The transaction identifier may correspond to an action performed by the SSK. The transaction identifier may be generated by an applicator of the watermark. Watermark information may be stored in a database such as database 211 (shown in FIG. 2).

Information 700 includes currency examination information 703. Examination information 703 includes one or more attributes of a bill that may be obtained by examining the bill. The bill may be retracted by a SSK. Examination information 703 includes a count. The count may be a number of bills retracted by the SSK. Examination information 703 includes a location. The location may correspond to a location of the SSK. Examination information 703 includes a denomination. The denomination may correspond to a denomination of a retracted bill.

Examination information 703 includes a bill serial number. The bill serial number may be any identifying characteristic of a retracted bill. Examination information 703 includes scanned watermark information. The scanned watermark information may include one or more informational items included in information 701.

Information 700 shows that watermark information 701 may include one or more attributes that are related to one or more attributes of examination information 703. For example, transaction identifier 711 of watermark information 701 may be included in scanned watermark information 715. A relationship between watermark information and examination information may be stored in a database such as database 211 (shown in FIG. 2).

Information 700 includes customer account information 705. Account information 705 includes attributes related to an account of a SSK customer. Account information 705 includes a customer name. Account information 705 includes an account number. Account information 705 includes account transaction log 713. Account transaction log 713 may list transactions that are associated with the account number. Information 700 shows that account information 705 may include one or more attributes of watermark information 701. For example, account transaction log 713 may include transaction identifier 711.

Information 700 includes SSK actions 707. SSK actions 707 include actions performed by an SSK such as an ATM. Illustrative SSK actions are show above in Table 1. Each SSK action performed may be associated with time/date 717. Time/date 717 may correspond to a time/date included in watermark information 701.

For example, a watermark applied to a retracted bill may include a time/date of the retraction. The time/date of the retraction may correspond to time/date 717. As a further example, a watermark applied to a retracted bill may include a time/date of a dispensing. The time/date of the dispensing may correspond to time/date 717. One or more relationships linking information 701, 705, 703 and 707 may be stored in database 211 (shown in FIG. 2).

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for marking of retracted currency have been provided. Persons skilled in the art will appreciate that the present invention can be practiced by other than the described embodiments, which are presented for purposes of illustration rather than of limitation. The present invention is limited only by the claims that follow.

What is claimed is:

1. A system for marking currency dispensed by an automated teller machine ("ATM"), the system comprising:
   a cash cassette configured to store cash;
   a cash dispenser configured to disburse the cash and retract the cash;
   an ultraviolet stamp applicator configured to apply an ultraviolet identifier to the cash retracted by the dispenser; and
   an ultraviolet stamp reader configured to read the ultraviolet identifier after the cash is retracted by the dispenser.

2. The system of claim 1 further comprising a purge-bin configured to store the cash retracted by the dispenser;
   wherein the ultraviolet stamp reader is configured to read the ultraviolet identifier after the cash is removed from the purge bin.

3. The system of claim 1 wherein the ultraviolet stamp applicator applies an ultraviolet identifier that is invisible to a human eye.

4. The system of claim 1 wherein the ultraviolet identifier comprises:
   a denomination;
   a transaction identifier associated with a request to withdraw the cash from the ATM; and
   a time and date.

5. A system for marking currency dispensed by an automated teller machine ("ATM"), the system comprising an ATM keypad, a cash cassette, a dispenser and an ultraviolet stamp applicator, the system configured to:
   receive, via the ATM keypad, a request for an amount of currency;
   extract the amount of currency from the cash cassette;
   dispense the amount of currency from the dispenser;
   retract at least a portion of the amount of currency using the dispenser; and
   apply an ultraviolet stamp to at least the retracted portion of the amount of currency using the ultraviolet stamp applicator.

6. The system of claim 5 further comprising a purge-bin and an ultraviolet stamp scanner, the system configured to:
   store the portion of the amount of currency in the purge bin;
   using the ultraviolet stamp scanner, read the ultraviolet stamp; and
   based on the read, determine a value of the portion of the currency.

7. The system of claim 5 wherein, when the portion of the amount of currency comprises a plurality of retracted notes, the ultraviolet stamp applicator is configured to apply the ultraviolet stamp to a first retracted note and a last retracted note.

8. The system of claim 5 wherein when the portion of the amount of currency comprises a plurality of retracted notes, the ultraviolet stamp applicator is configured to apply the ultraviolet stamp to each of the notes in the plurality.

9. The system of claim 5 further comprising a computer system, the computer system configured to:
   identify a customer account associated with the request; and
   debit the customer account a difference between the amount and the value.

10. The system of claim 5, wherein, when the currency comprises a plurality of notes, the ultraviolet stamp comprises:
    a denomination of each note in the plurality of notes; and
    a transaction identifier associated with the request for the amount of currency.

11. The system of claim 5 further comprising an ultraviolet stamp scanner, the scanner configured to read the ultraviolet stamp and erase the ultraviolet stamp.

12. A method for determining a value of bills retracted by an automated teller machine ("ATM"), the method comprising:
- the ATM receiving a request to dispense a plurality of bills;
- a dispenser of the ATM retracting at least a portion of the plurality of bills;
- a watermark stamp applicator of the ATM that includes hardware applying a watermark to each bill in the retracted portion of the plurality of bills;
- a computer system of the ATM that includes hardware associating a transaction identifier with the watermark;
- a watermark scanner of the ATM scanning the watermark on each bill included in the retracted portion of bills;
- the computer system associating the transaction identifier with the watermark; and
- the computer system, based on the scanning of the watermark, determining a value corresponding to the portion of bills.

13. The method of claim 12 further comprising,
- the computer system associating the value with the transaction identifier;
- the computer system identifying a customer account corresponding to the transaction identifier; and
- the computer system debiting the customer account a difference between the amount and the value.

14. The method of claim 13 further comprising, the watermark scanner erasing the watermark from each bill after the scanning.

15. The method of claim 12 further comprising:
- the computer system receiving a mis-dispense claim comprising a request for a refund amount;
- the computer system relating the mis-dispense claim to:
  - the transaction identifier associated with the watermark; and
  - the value corresponding to the portion of the bills;
- the computer system comparing the refund amount to the value; and
- the computer system responding to the mis-dispense claim based on a difference between the refund amount and the value.

16. The method of claim 12 wherein the watermark comprises a time and date stamp.

17. The method of claim 16 further comprising:
- the computer system identifying:
  - a claimant associated with the mis-dispense claim; and
  - an account associated with the claimant; and
- the computer system determining if the account is associated with the time and date stamp.

* * * * *